(12) United States Patent
Hwang et al.

(10) Patent No.: US 10,244,275 B2
(45) Date of Patent: Mar. 26, 2019

(54) METHOD AND APPARATUS FOR TRANSMITTING/RECEIVING SIGNALING INFORMATION IN DIGITAL BROADCAST SYSTEM

(71) Applicants: Samsung Electronics Co., Ltd., Suwon-si, Gyeonggi-do (KR); KYONGGI UNIVERSITY INDUSTRY & ACADEMIA COOPERATION FOUNDATION, Suwon-si, Gyeonggi-do (KR)

(72) Inventors: Sung-Hee Hwang, Suwon-si (KR); Byoung-Dai Lee, Yongin-si (KR); Hyun-Koo Yang, Seoul (KR); Sung-Oh Hwang, Yongin-si (KR)

(73) Assignees: Samsung Electronics Co., Ltd., Suwon-si (KR); Kyonggi University Industry & Academia Cooperation Foundation, Suwon-si (KR)

( * ) Notice: Subject to any disclaimer, the term of this patent is extended or adjusted under 35 U.S.C. 154(b) by 0 days.

(21) Appl. No.: 15/115,144

(22) PCT Filed: Mar. 2, 2015

(86) PCT No.: PCT/KR2015/001994
§ 371 (c)(1),
(2) Date: Jul. 28, 2016

(87) PCT Pub. No.: WO2015/130151
PCT Pub. Date: Sep. 3, 2015

(65) Prior Publication Data
US 2016/0353135 A1    Dec. 1, 2016

(30) Foreign Application Priority Data
Feb. 28, 2014 (KR) .................. 10-2014-0024442

(51) Int. Cl.
*H04N 21/2362* (2011.01)
*H04N 21/235* (2011.01)
(Continued)

(52) U.S. Cl.
CPC ....... *H04N 21/2362* (2013.01); *H04N 21/235* (2013.01); *H04N 21/435* (2013.01); *H04N 21/637* (2013.01)

(58) Field of Classification Search
CPC .................................................. H04N 21/2362
See application file for complete search history.

(56) References Cited

U.S. PATENT DOCUMENTS 6,381,600 B1 * 4/2002 Lau .................. G06F 17/30595
7,921,134 B2 * 4/2011 Morris ................. H04N 21/643
707/631

(Continued)

FOREIGN PATENT DOCUMENTS

| CN | 101778340 A | 7/2010 |
|----|-------------|--------|
| CN | 102439967 A | 5/2012 |

(Continued)

OTHER PUBLICATIONS

Jani Vare, Techniques for Signaling and Service Discovery in DVB-H Networks, Apr. 8, 2011.
(Continued)

*Primary Examiner* — Ricky Chin
(74) *Attorney, Agent, or Firm* — Jefferson IP Law, LLP (57) ABSTRACT

The present invention relates to a method for transmitting signaling information in a digital broadcast system, the method comprising the steps of: adaptively generating a signaling table relating to signaling information transmitted from a data link layer on the basis of at least one structure among a hierarchical structure and a flat structure on the
(Continued)

Table_X
```
...
use_reference_flag = '0'
...
if (use_separate_table_flag == '1')
  descriptor_ID
else
  descriptor_data()
...
```

Table_Y
```
...
descriptor_data()
descriptor_data()
...
``` basis of a characteristic of service configuration; and transmitting the generated signaling table.

8 Claims, 6 Drawing Sheets

(51) Int. Cl.
*H04N 21/435* (2011.01)
*H04N 21/637* (2011.01)

(56) References Cited

U.S. PATENT DOCUMENTS

| | | | | |
|---|---|---|---|---|
| 2005/0060647 | A1* | 3/2005 | Doan | G06F 17/30554 715/205 |
| 2006/0265645 | A1* | 11/2006 | Lee | H04N 21/26283 715/234 |
| 2007/0124302 | A1* | 5/2007 | Korn | G06F 17/30569 |
| 2008/0216133 | A1* | 9/2008 | Vergoossen | H04N 21/23109 725/86 |
| 2009/0025051 | A1* | 1/2009 | Hong | H04N 7/17318 725/114 |
| 2009/0052587 | A1* | 2/2009 | Song | H04L 27/0012 375/340 |
| 2009/0299966 | A1* | 12/2009 | Schneider | G06F 17/30327 |
| 2010/0195633 | A1* | 8/2010 | Vare | H04W 36/385 370/338 |
| 2011/0238787 | A1* | 9/2011 | Chen | H04N 7/17318 709/217 |
| 2012/0063407 | A1 | 3/2012 | Park et al. | |
| 2012/0110412 | A1 | 5/2012 | Lee et al. | |
| 2013/0291027 | A1 | 10/2013 | Hwang et al. | |
| 2013/0343468 | A1 | 12/2013 | Ko et al. | |
| 2015/0052570 | A1 | 2/2015 | Lee et al. | |

FOREIGN PATENT DOCUMENTS

| | | |
|---|---|---|
| KR | 10-2009-0021125 A | 2/2009 |
| KR | 10-2010-0051203 A | 5/2010 |
| KR | 10-2013-0120416 A | 11/2013 |
| WO | 2013-058633 A1 | 4/2013 |

OTHER PUBLICATIONS

Chinese Office Action dated Sep. 5, 2018, issued in a counterpart Chinese application No. 201580011123.8.

* cited by examiner

METHOD AND APPARATUS FOR TRANSMITTING/RECEIVING SIGNALING INFORMATION IN DIGITAL BROADCAST SYSTEM

CROSS-REFERENCE TO RELATED APPLICATION(S)

This application is a National Phase Entry of PCT International Application No. PCT/KR2015/001994, which was filed on Mar. 2, 2015, and claims a priority to a Korean Patent Application No. 10-2014-0024442, which was filed on Feb. 28, 2014, the contents of which are incorporated herein by reference.

TECHNICAL FIELD

The present invention relates to a method and an apparatus for transmitting/receiving signaling information in a digital broadcasting system and, especially, to a method and an apparatus for transmitting/receiving signaling information in a data link layer of a digital broadcasting system.

BACKGROUND ART

According to the development of a service toward convergence between a broadcasting service and a communication service, multimedia services provided through various media are being universalized. That is, a service using an existing broadcasting media such as a ground-wave, a satellite, or a cable has been diversified based on a digital scheme, and at the same time, convergence services such as mobile broadcasting services such as a Digital multimedia broadcasting (hereinafter, referred to as "DMB") service, a Digital Video Broadcasting-Handheld (hereinafter, referred to as "DVP-H"), and an Advanced Television Systems Committee-Mobile/Handheld (hereinafter, referred to as "ATSC-M/H") service, and an Internet Protocol Television (hereinafter, referred to as "IPTV") service have appeared. Especially, digital broadcasting provides a program having a picture dozens of times clearer than existing analog broadcasting, a sound quality which is a Compact Disk (hereinafter, referred to as "CD") level and provides many more channels, thereby providing opportunities for a wide selection, a new bidirectional service such as home shopping, home banking, e-mail, Internet and a high-grade broadcasting service.

Meanwhile, in order to provide a digital broadcasting service, various types of signaling information are required. The signaling information may be divided into two primary types, for example, service acquisition (hereinafter, referred to as "Service Acquisition") information and service announcement (hereinafter, referred to as "Service Announcement") information. Each of the service acquisition information and the service announcement information will be described below.

The service acquisition information includes information required by a reception apparatus to physically receive a digital broadcasting service. For example, the information may be information required to receive service configuration information and a media component.

The service announcement information is information which is used in a case of selecting a digital broadcasting service by a reception apparatus, and provides additional information with respect to the digital broadcasting service. For example, the service announcement information may include a service genre, service schedule information, and a synopsis.

Meanwhile, the signaling information may be generally transmitted through a data link layer or an application program layer, and a type of signaling information transmitted in each of transmission layers may be changed according to an individual broadcasting standard. Generally, in consideration of a transmission bandwidth and a channel mapping time, only the minimum signaling information which is required for a digital broadcasting service reception and a digital broadcasting service selection is transmitted through the data link layer. In contrast, much more signaling information is transmitted through the application program layer, compared to the data link layer.

Meanwhile, signaling information transmitted through the data link layer is transmitted by using a signaling table structure, and various types of signaling tables are used according to an individual broadcasting standard. However, in the case of transmitting signaling information through the data link layer, all signaling information in a single signaling table is not stored and transmitted. Instead, a plurality of signaling tables are generated according to each purpose, and the signaling tables are associated with each other based on an Identifier (hereinafter, referred to as "ID") information, so as to form a hierarchical structure for transmission. For example, representative signaling tables used in a moving picture experts group-2 (MPEG-2) transport stream (TS) (hereinafter, referred to as "MPEG-2 TS") standard include a program association table (hereinafter, referred to as "PAT") storing service configuration information included in a TS and a program map table (hereinafter, referred to as "PMT") storing media component configuration information of an individual service. The two tables may be interconnected by using an attribute of "program_number". That is, in order to obtain detailed information with respect to an arbitrary service X, additional information with respect to an individual media component of the service X may be acquired by analyzing a PMT having an identical "program_number", using a "program_number" of a service X obtained through the PAT.

In addition, a scheme of defining a separate signaling table according to each purpose and providing a hierarchical structure formed through mutual contact between corresponding signaling tables has an excellent effect when the number of services included in a transmission stream is large, in comparison with the flat structure scheme using a single independent signaling table for transmission. For example, when there are a large number of services and media components which constitute an individual service, if all signaling information is stored in a single signaling table and thus a size of a corresponding signaling table increases, ultimately, a time which is required to receive the corresponding signaling table in a reception apparatus increases. In addition, in this case, when signaling information is changed, a time which is required to update a signaling table due to a change of the signaling information also increases. In addition, in a case of maintaining an individual signaling table according to each purpose, it is advantageous for management side of signaling information in a transmitter.

However, if a transmission stream is composed of a small number of services, a single signaling table structure may be more effective. That is, when a transmission stream is composed of a small number of services, although signaling information is integrated with a single signaling table and then transmitted, since a size of a signaling table increases enough to provide a sufficient transmission/reception performance, performance degradation due to reception of the signaling table may be minimized in a reception apparatus side. Meanwhile, a processing complexity of a reception apparatus may be reduced since all information may be acquired from the reception of the single signaling table.

As described above, a hierarchical structure scheme and a flat structure scheme have different merits and demerits according to characteristics of a service configuration.

However, in a general digital broadcasting system, only a hierarchical structure has been used in constituting signaling information. Accordingly, use of a flat structure having the merits as described above has not been completely considered.

DETAILED DESCRIPTION OF THE INVENTION

Technical Problem

An embodiment of the present invention proposes a method and an apparatus for transmitting/receiving signaling information in a digital broadcasting system.

In addition, an embodiment of the present invention proposes a method and an apparatus for transmitting/receiving signaling information in a data link layer of a digital broadcasting system.

In addition, an embodiment of the present invention proposes a method and an apparatus for transmitting/receiving signaling information by adaptively selecting a hierarchical structure or a flat structure in a data link layer of a digital broadcasting system.

In addition, an embodiment of the present invention proposes a method and an apparatus for transmitting/receiving signaling information so as to reduce a signaling processing complexity in a data link layer of a digital broadcasting system.

In addition, an embodiment of the present invention proposes a method and an apparatus for transmitting/receiving signaling information so as to increase efficiency of a transmission bandwidth in a data link layer of a digital broadcasting system.

Technical Solution

A method for transmitting signaling information in a digital broadcasting system proposed by the present invention comprises: adaptively generating a signaling table related to signaling information transmitted from a data link layer, on the basis of a characteristic of service configuration, based on at least one of a hierarchical structure and a flat structure; and transmitting the generated signaling table.

Another method for receiving signaling information in a digital broadcasting system proposed by the present invention comprises: receiving a signaling table, wherein the signaling table is a signaling table associated with signaling information transmitted in a data link layer, and is adaptively generated based on at least one of a hierarchical structure and a flat structure, on the basis of a characteristic of service configuration.

An apparatus for transmitting signaling information in a digital broadcasting system proposed by the present invention comprises: a controller that adaptively generates a signaling table related to signaling information transmitted from a data link layer, on the basis of a characteristic of service configuration, based on at least one of a hierarchical structure and a flat structure; and a transmitter that transmits the generated signaling table.

Another apparatus for receiving signaling information in a digital broadcasting system proposed by the present invention comprises: a receiver that receives a signaling table, wherein the signaling table is a signaling table associated with signaling information transmitted in a data link layer, and is adaptively generated based on at least one of a hierarchical structure and a flat structure, on the basis of a characteristic of service configuration.

Advantageous Effects

An embodiment of the present invention can achieve an adaptive configuration, by which a table structure for signaling information transmitted in a data link layer, can be configured and transmitted in a flat structure scheme as well as a hierarchical structure. Therefore, the embodiment of the present invention enables effective use of transmission bandwidth and can simplify the processing of signaling information by a transmission/reception apparatus.

In addition, an embodiment of the present invention can provide the same effect by enabling information which is commonly used in an individual table to be included or enabling information stored in a separate table to be referred to.

BRIEF DESCRIPTION OF THE DRAWINGS

Other aspects, features, and benefits as described in specific exemplary embodiments of the present invention will become more obvious with the following description which is processed together with accompanying drawings.

MODE FOR CARRYING OUT THE INVENTION

Hereinafter, embodiments of the present invention will be described in detail with reference to the accompanying drawings. In the following description, it should be noted that only portions required for comprehension of operations according to the embodiments of the present invention will be described and descriptions of other portions will be omitted not to make subject matters of the present invention obscure. Meanwhile, terms described later are defined in consideration of the functions of the present invention, but the meaning of the terms may be changed according to a user, intention of an operator, or convention. Therefore, the definitions of the terms should be made based on the contents throughout the specification.

The present invention may have various modifications and various embodiments, among which specific embodiments will now be described more fully with reference to the accompanying drawings. However, it should be understood that the present invention is not limited to the specific embodiments, but the present invention includes all modifications, equivalents, and alternatives within the spirit and the scope of the present invention.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present invention. As used herein, the term "and/or" includes any and all combinations of one or more associated items.

The terms used herein are used only to describe particular embodiments, and are not intended to limit the present invention. As used herein, the singular forms are intended to include the plural forms as well, unless the context clearly indicates otherwise. In the present invention, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof Unless defined otherwise, all terms used herein, including technical and scientific terms, have the same meaning as those commonly understood by a person of ordinary skill in the art to which the present invention pertains. Such terms as those defined in a generally used dictionary are to be interpreted to have the meanings equal to the contextual meanings in the relevant field of art, and are not to be interpreted to have ideal or excessively formal meanings unless clearly defined in the present specification.

An embodiment of the present invention proposes a method and an apparatus for transmitting/receiving signaling information in a digital broadcasting system.

In addition, an embodiment of the present invention proposes a method and an apparatus for transmitting/receiving signaling information in a data link layer of a digital broadcasting system.

In addition, an embodiment of the present invention proposes a method and an apparatus for transmitting/receiving signaling information by adaptively selecting a hierarchical structure and a flat structure in a data link layer of a digital broadcasting system.

In addition, an embodiment of the present invention proposes a method and an apparatus for transmitting/receiving signaling information so as to reduce signaling processing complexity in a data link layer of a digital broadcasting system.

In addition, an embodiment of the present invention proposes a method and an apparatus for transmitting/receiving signaling information so as to increase efficiency of transmission bandwidth in a data link layer of a digital broadcasting system.

In addition, an apparatus and a method proposed by an embodiment of the present invention may be applied to mobile broadcasting services such as a Digital Multimedia Broadcasting (hereinafter, referred to as "DMB") service, a Digital Video Broadcasting-Handheld (hereinafter, referred to as "DVP-H"), and an Advanced Television Systems Committee-Mobile/Handheld (hereinafter, referred to as "ATSCH-M/H") service, a digital video broadcasting system such as an Internet Protocol Television (hereinafter, referred to as "IPTV") service and various communication systems such as a Moving Picture Experts Group (MPEG) Media Transport (hereinafter, referred to as "MMT") system, a Long-Term Evolution (hereinafter, referred to as "LTE") mobile communication system, a Long-Term Evolution-Advanced (hereinafter, referred to as "LTE-A") mobile communication system, a High Speed Downlink Packet Access (hereinafter, referred to as "HSDPA") mobile communication system, a High Speed Uplink Packet Access (hereinafter, referred to as "HSUPA") mobile communication system, a High Rate Packet Data (hereinafter, referred to as "HRPD") mobile communication system of a 3rd Generation Project Partnership 2 (hereinafter, referred to as "3GPP2"), a Wideband Code Division Multiple Access (hereinafter, referred to as "WCDMA") mobile communication system of a 3GPP2, a Code Division Multiple Access (hereinafter, referred to as "CDMA") communication system of a 3GPP2, an Institute Of Electrical And Electronics Engineers (hereinafter, referred to as "IEEE") 802.16m communication system, an Evolved Packet System (hereinafter, referred to as "EPS"), and a Mobile Internet Protocol (hereinafter, referred to as "Mobile IP") system.

Then, by referring to FIG. 1, a structure of a reception apparatus in a digital broadcasting system according to an embodiment of the present invention will be described.

Figure 1:
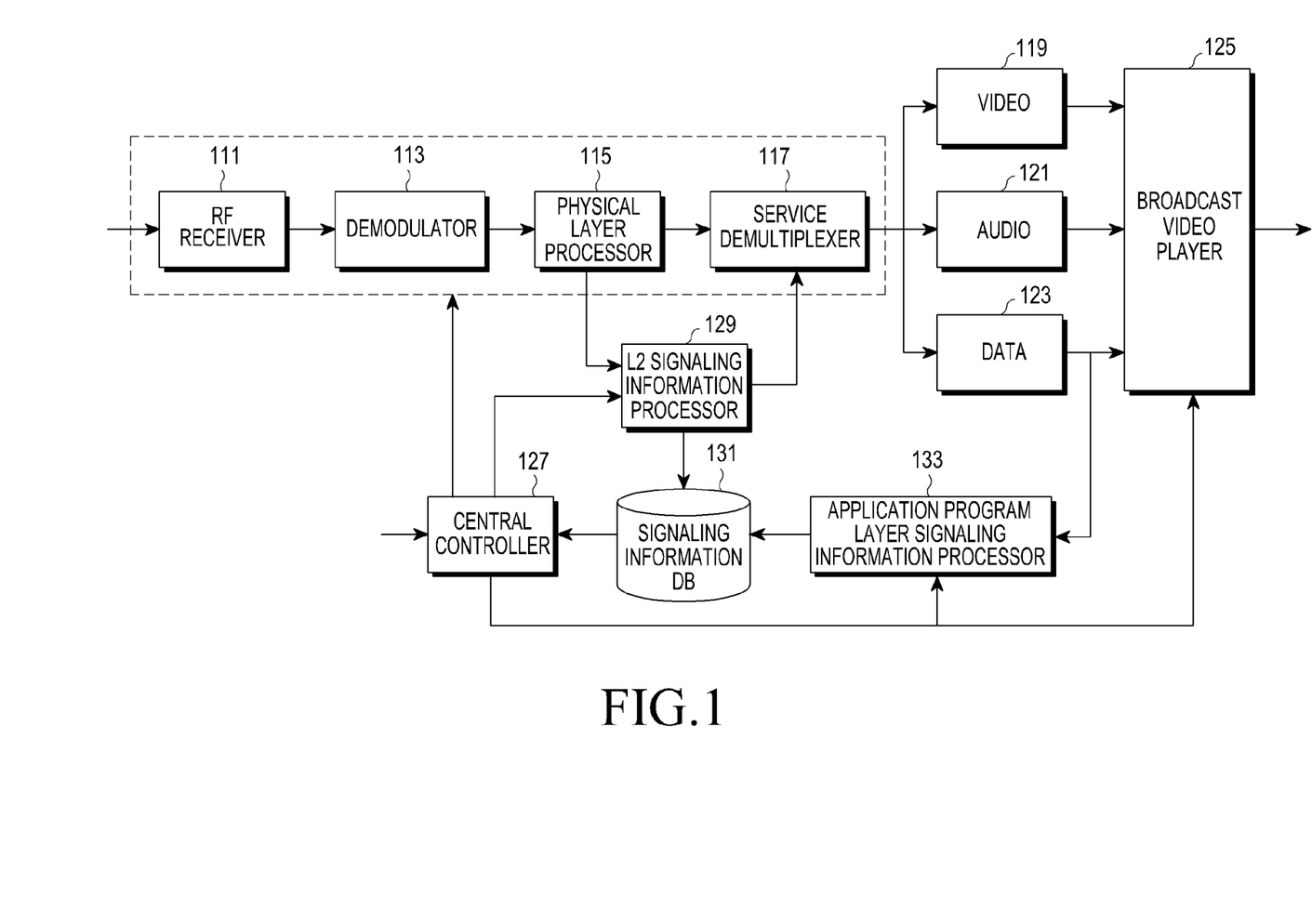
FIG. 1 illustrates a structure of a reception apparatus in a digital broadcasting system according to an embodiment of the present invention.

FIG. 1 schematically illustrates a structure of a reception apparatus in a digital broadcasting system according to an embodiment of the present invention.

Referring to FIG. 1, the reception apparatus includes a Radio Frequency (hereinafter, referred to as "RF") receiver 111, a demodulator 113, a physical layer processor 115, a service demultiplexer 117, a broadcast video player 125, a central controller 127, a Layer 2 (hereinafter referred to as "L2") signaling information processor 129, a signaling information Data Base (hereinafter, referred to as "DB") 131, and an application program layer signaling information processor 133.

The central controller 127 controls general operations of the reception apparatus including a user input process. When detecting a user's selection of a specific service, the central controller 127 identifies the signaling information DB 131 and changes a channel into a frequency through which the specific service is transmitted. Of course, when the central controller 127 has already received a signal through a corresponding channel, a channel change operation itself is not required to perform.

The RF receiver 111 receives an analog signal transmitted through a corresponding channel, and the demodulator 113 converts the analog signal received through the RF receiver 111 into a digital signal and transfers the converted digital signal to the physical layer processor 115. The physical layer processor 115 performs an operation to be performed in a physical layer of a transport protocol stack and respectively transfers a result of the performing to the L2 signaling information processor 129 and the service demultiplexer 117.

The L2 signaling information processor 129 processes and analyzes signaling information transmitted to the data link layer and stores a result of the analysis in the signaling information DB 131. The service demultiplexer 117 extracts each of component streams which constitute the specific service including an audio stream and a video stream of the selected specific service, from a data unit extracted from the physical layer and transfers the selected component stream to the broadcast video player 125.

The broadcast video player 125 decodes the transmitted audio data and video data and plays broadcasting video at a corresponding time on the basis of synchronization information.

In addition, the application program layer signaling information processor 133 analyzes signaling data transmitted to an application program layer and stores the analyzed signaling data in signaling information DB 131. The signaling information DB 131 is a logical object. The L2 signaling information processor 129 and the application program signal information processor 133 may maintain a DB in each independent form or may share the same DB.

Among units included in a reception apparatus proposed by an embodiment of the present invention, especially, the L2 signaling information processor 129 is differentiated from an L2 signaling information processor of a reception apparatus of a general digital broadcasting system, which will be described below.

The L2 signaling information processor 129 detects whether a signaling table structure which stores signaling information on the basis of data transferred from the physical layer processor 115 is a hierarchical structure or a flat structure, and processes the signaling information on the basis of the detected result. That is, a signaling table structure in which signaling information is stored is not considered at all by an L2 signaling information processor of a reception apparatus of a general digital broadcasting system. On the other hand, the L2 signaling information processor proposed by an embodiment of the present invention may process signaling information by considering a signaling table structure in which the signaling information is stored. Meanwhile, FIG. 1 illustrates the RF receiver 111, the demodulator 113, the physical layer processor 115, the service demultiplexer 117, the broadcast video player 125, the central controller 127, the L2 signaling information processor 129, the signaling information DB 131, and the application program layer signaling information processor 133 which are implemented as separate units, however, two or more units among the RF receiver 111, the demodulator 113, the physical layer processor 115, the service demultiplexer 117, the broadcast video player 125, the central controller 127, the L2 signaling information processor 129, the signaling information DB 131, and the application program layer signaling information processor 133 can also be integrated into and implemented as a single unit.

In FIG. 1, a structure of a reception apparatus in a digital broadcasting system according to an embodiment of the present invention is described. Next, by referring to FIG. 2, operation processes of the reception apparatus in the digital broadcasting system according to an embodiment of the present invention will be described.

Figure 2:
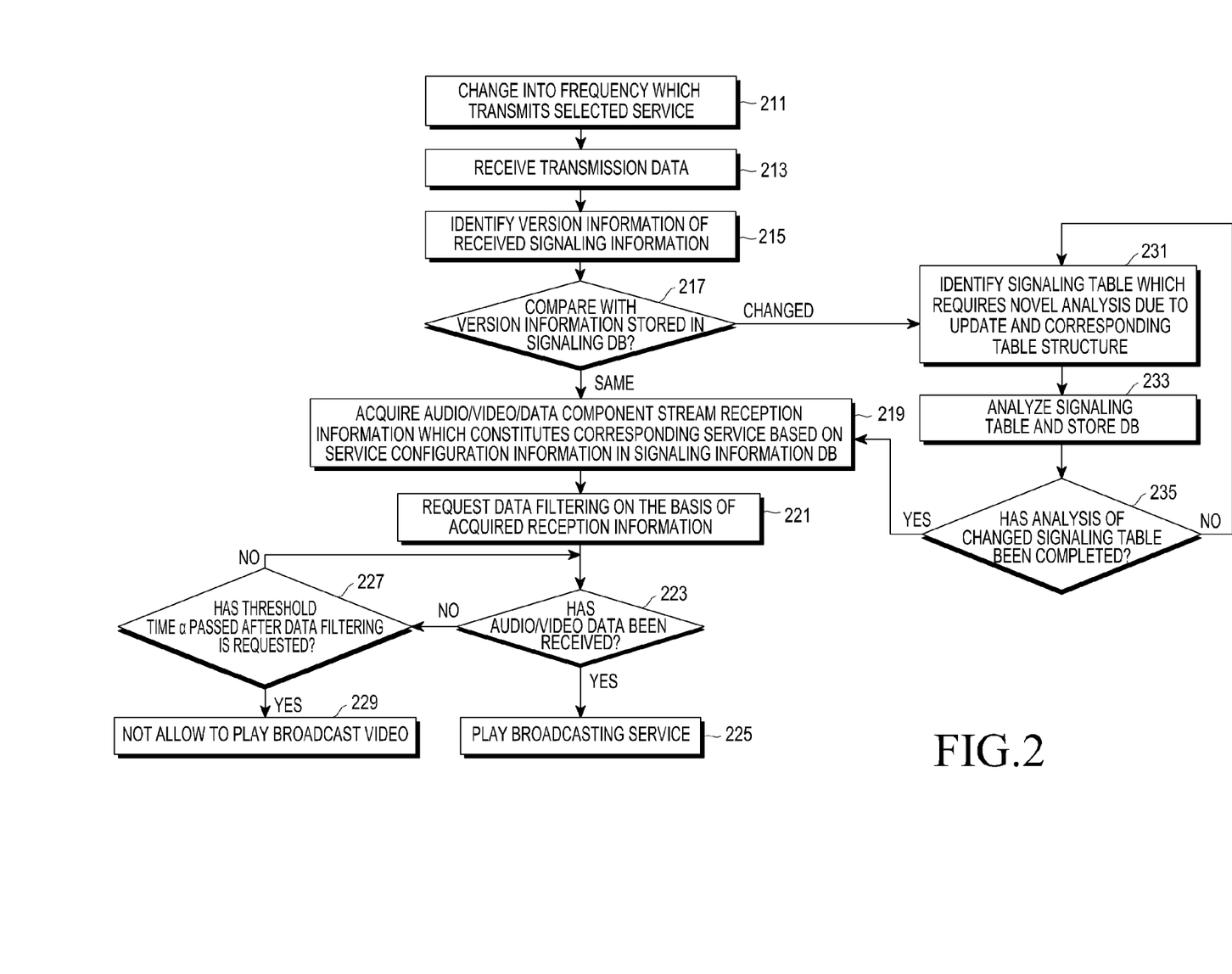
FIG. 2 schematically illustrates an operation process of a reception apparatus in a digital broadcasting system according to an embodiment of the present invention.

FIG. 2 schematically illustrates an operation process of a reception apparatus in a digital broadcasting system according to an embodiment of the present invention.

Referring to FIG. 2, first, in step 211, when detecting a user's selection of a specific service, the reception apparatus changes a channel into a frequency through which the selected specific service is transmitted, and proceeds to step 213. Here, if the reception apparatus has already received service data through a channel through which the selected specific service is transmitted, an operation of changing the channel may not be performed. In step 213, the signal reception apparatus receives service data through the channel and then proceeds to step 215. In step 215, the reception apparatus, using data received through the channel, compares version information of main signaling information which exists in a data link layer with version information of corresponding signaling information included in a signaling information DB, identifies whether to update, and proceeds to step 217.

In step 217, a result of the identifying, if the signaling information DB is not required to update, that is, when signaling information required to receive a service is not changed, the reception apparatus proceeds to step 219. In step 219, the reception apparatus extracts, from the signaling information DB, ID information of a video, an audio, and a data stream which constitute the selected service and then proceeds to step 221. In step 221, the reception apparatus requests data filtering to a transmission apparatus, on the basis of ID information of a video, audio, and data stream, which are extracted in step 219, and proceeds to step 223. In this way, if data filtering is requested by using ID information of a service configuration element, that is, the extracted ID information of a video, an audio, and a data stream, the reception apparatus will be able to selectively receive only data related to corresponding ID information among data transmitted using a current frequency.

Meanwhile, in step 223, the reception apparatus checks whether audio/video data is received through the channel That is, the reception apparatus checks whether service configuration elements are normally received through the channel. As a result of the check, when audio/video data is received through the channel, the reception apparatus proceeds to step 225. In step 225, the reception apparatus plays a broadcasting service on the basis of the received audio/video data.

Meanwhile, in step 223, when the reception apparatus does not receive audio/video data through the channel, that is, when service configuration elements are not normally received, the reception apparatus proceeds to step 227. In step 227, the reception apparatus checks whether a pre-set time, for example, threshold time α has elapsed. As a result of the check, if the threshold time α has not elapsed, the reception apparatus returns to step 223. In this case, for example, the threshold time a may be counted from the time point that the reception apparatus requests data filtering.

Meanwhile, as a result of the check in step 227, if the threshold time a has elapsed, the reception apparatus proceeds to step 229. In step 229, the reception apparatus outputs information indicating that the video cannot be received.

Meanwhile, as a result of the identifying in step 217, if the signaling information DB is required to update, that is, when signaling information required to receive a service is changed, the reception apparatus proceeds to step 231. In step 231, the reception apparatus detects a signaling table to be updated, detects a configuration scheme of the detected corresponding signaling table, that is, a hierarchical structure scheme or a flat structure scheme, and then proceeds to step 233. In step 233, the reception apparatus receives the corresponding signaling table from the transmission apparatus, updates the signaling information DB, and then proceeds to step 235. At this time, operations of detecting of the signaling table configuration scheme, receiving of the corresponding signaling table, and updating the signaling information DB are performed on all signaling tables which are updated.

Accordingly, in step 235, the reception apparatus checks whether an analysis of the changed signaling table has been completed. As a result of the check, if the analysis of the changed signaling table has not been completed, the reception apparatus returns to step 231. As a result of the check in step 235, if the analysis of the changed signaling table has been completed, the reception apparatus proceeds to step 219.

Meanwhile, although FIG. 2 illustrates an operation process of a reception apparatus in a digital broadcasting system according to an embodiment of the present invention, various modifications with respect to FIG. 2 may also occur. For example, although successive steps are illustrated in FIG. 2, the steps illustrated in FIG. 2 may overlap each other, may be performed in parallel, may be performed in a different order, or may be performed several times.

Meanwhile, an embodiment of the present invention has two features below, in consideration of a table structure for transmitting signaling information transmitted through a data link layer.

(1) A hierarchical structure is not fixedly used for a signaling table configuration. Instead, all necessary information is selectively configured in a single table according to a characteristic of service configuration. That is, a flat structure scheme can be used.

A separate signaling table is defined for each purpose. Data stored in such signaling tables may be associated with each other using ID information to form a hierarchical structure for later transmission, or all of these signaling tables may be integrated within a single table to form a flat structure for later transmission.

(2) Information, which may be used in common, such as information on a video/audio decoder initialization, may be used in a reference scheme instead of being repeatedly included in every signaling table for transmission.

Data used in a signaling table in the same type is independently included in each signaling table to transmit signaling information, or the data which is commonly used is stored in an individual signaling table and used by referring to associated information in a signaling table which requires corresponding information. For example, it is assumed that signaling table S(1) and signaling table S(2) are signaling tables storing information on service 1 and service 2, respectively, and it is assumed that configuration information for decoding of a video stream is included in the signaling table. In addition, it is assumed that the service 1 and the service 2 use the same decoding information. In this case, the signaling table S(1) and the signaling table S(2) may be configured by independently including video decoding information and be then transmitted, or the video decoding information may be stored and transmitted in a separate signaling table X. The signaling table S(1) and the signaling table S(2) may be transmitted while including only ID information to enable extraction of video decoding information included in the table X.

In order to provide a signaling table structure selection function, a scheme proposed by an embodiment of the present invention will be described below.

First, a scheme groups information which may be included in a higher signaling table or a separate independent signaling table, and determines a location of corresponding information by utilizing a separate flag which informs a signaling table configuration scheme, in the higher signaling table.

Then, by referring to FIG. 3, a process of adaptively selecting a signaling table structure in a digital broadcasting system according to an embodiment of the present invention will be described.

Figure 3:
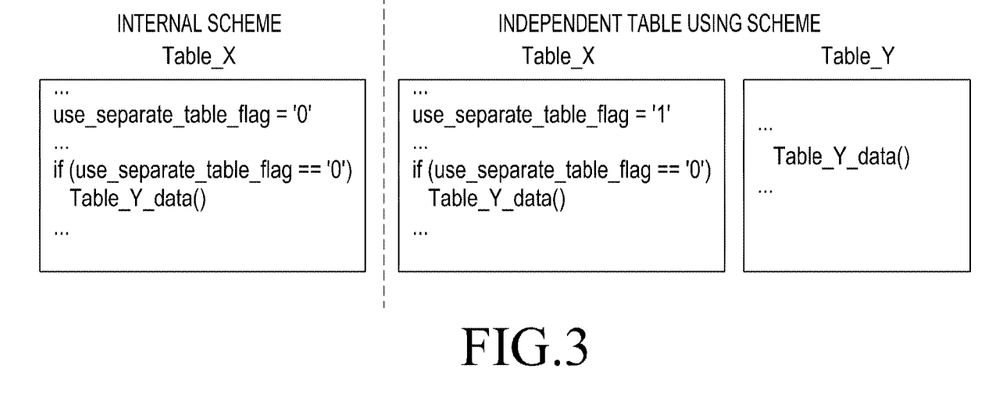
FIG. 3 schematically illustrates a process of adaptively selecting a signaling table structure in a digital broadcasting system according to an embodiment of the present invention.

FIG. 3 schematically illustrates a process of adaptively selecting a signaling table structure in a digital broadcasting system according to an embodiment of the present invention.

Referring to FIG. 3, "use_separate_table_flag" is a flag which determines a location of grouped signaling information, for example, grouped signaling information such as Table_Y_data( ). When a value of the "use_separate_table_flag" represents a pre-set value, for example, a value of "1", the corresponding signaling information is transmitted through Table_Y which is a separate signaling table, when a value of the "use_separate_table_flag" represents a pre-set value, for example, a value of "0", the corresponding signaling information is included in Table_X which is a higher signaling table and is transmitted. Especially, it is not required that only one flag which indicates the signaling table configuration scheme should exist in a signaling table. In the case of including many signaling tables in the same level for transmission, as many corresponding flags as the number of the tables may be used.

Meanwhile, in order to provide a common information reference function, a scheme proposed by an embodiment of the present invention will be described below.

First, the scheme defines a common information table storing information commonly used in a plurality of signaling tables, and each of common information stored in the common information table includes ID information and thus each of the common information can be distinguished in the common information table. In each signaling table, a separate flag is defined for determining a location of common information, and associated information is included in the signaling table and stored, according to the defined value of a corresponding flag, or the associated information may be determined to refer to a common information table.

Then, by referring to FIG. 4, a process of providing a common information reference function in a digital broadcasting system according to an embodiment of the present invention will be described.

Figure 4:
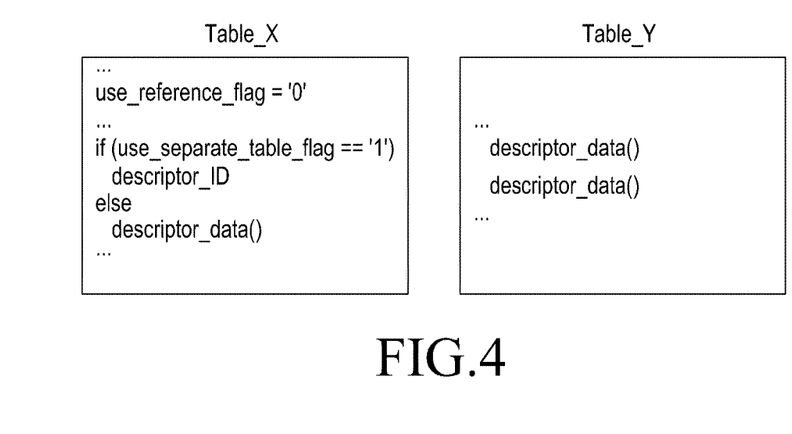
FIG. 4 schematically illustrates a process of providing a common information reference function in a digital broadcasting system according to an embodiment of the present invention.

FIG. 4 schematically illustrates a process of providing a common information reference function in a digital broadcasting system according to an embodiment of the present invention.

Referring to FIG. 4, Table_Y is a common information table and stores various common information, for example, descriptor_data( ). In this case, information stored in Table_Y which is the common information table may be information in the same type, or information in different types.

Meanwhile, Table_X which is a signaling table defines whether corresponding information is included in the signaling table and is transmitted by using "use_reference_flag" or whether corresponding information should be extracted by referring to common information table.

Meanwhile, a structure and a format of a signaling table transmitted through a data link layer proposed by a digital broadcasting system according to an embodiment of the present invention will be concretely described below.

First, by referring to FIG. 5, a logical structure of a digital broadcasting service provided by a digital broadcasting system according to an embodiment of the present invention will be described.

Figure 5:
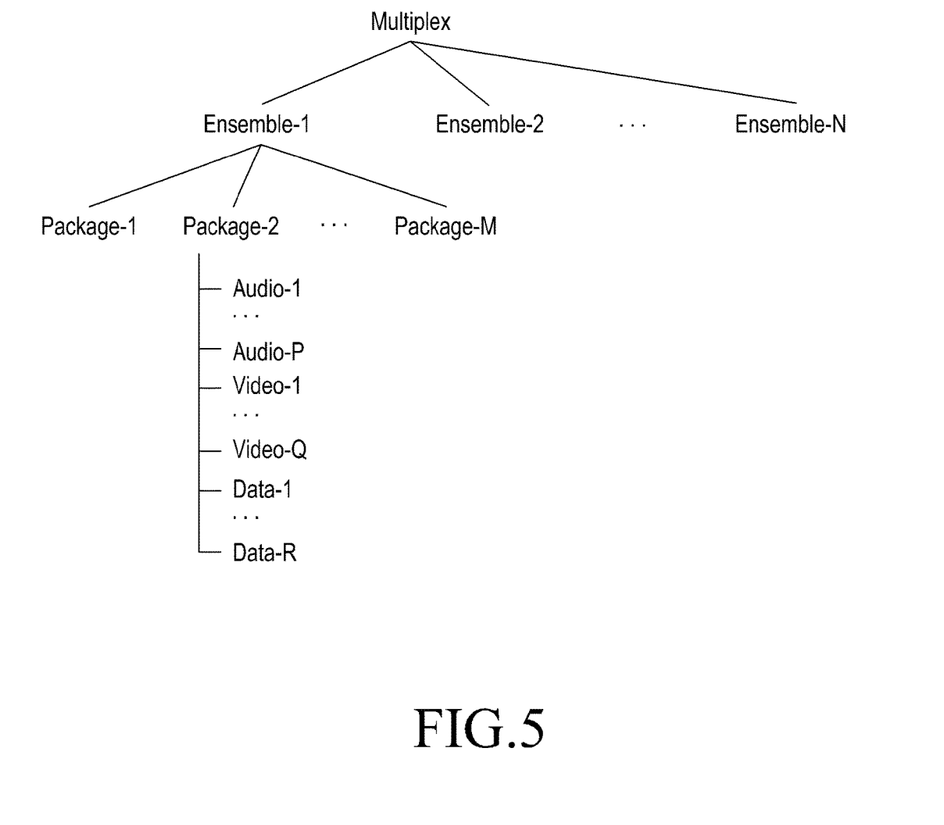
FIG. 5 schematically illustrates a logical structure of a digital broadcasting service provided by a digital broadcasting system according to an embodiment of the present invention.

FIG. 5 schematically illustrates a logical structure of a digital broadcasting service provided by a digital broadcasting system according to an embodiment of the present invention.

Referring to FIG. 5, a transmission stream transmitted through each of the frequencies, for example, a multiplex includes N number of ensembles. At this time, one ensemble includes a plurality of packages and provides a grouping of associated packages. A package indicates a real broadcasting service and includes a plurality of audio/video/data streams. In addition, the package selects one audio and video stream according to characteristic of a service to play or selects a plurality of audio/video/data streams through division of a screen to simultaneously play.

Meanwhile, in an embodiment of the present invention, the following four signaling tables are defined, and a main function of each table will be described below.

(1) Multiplex Description Table (hereinafter, referred to as "MDT")—which provides information related to a transmission stream.

(2) Package Description Table (hereinafter, referred to as "PDT")—which provides information related to an individual package. A PDT independently exists by a package.

(3) Media Sync Table (MST, hereinafter, referred to as "MST")—which provides synchronization information of an audio/video stream.

(4) Shared Information Table (hereinafter, referred to as "SIT")—which is a signaling table storing common information.

Then, by referring to FIG. 6, an example of a table configuration scheme in a digital broadcasting system according to an embodiment of the present invention will be described.

Figure 6:
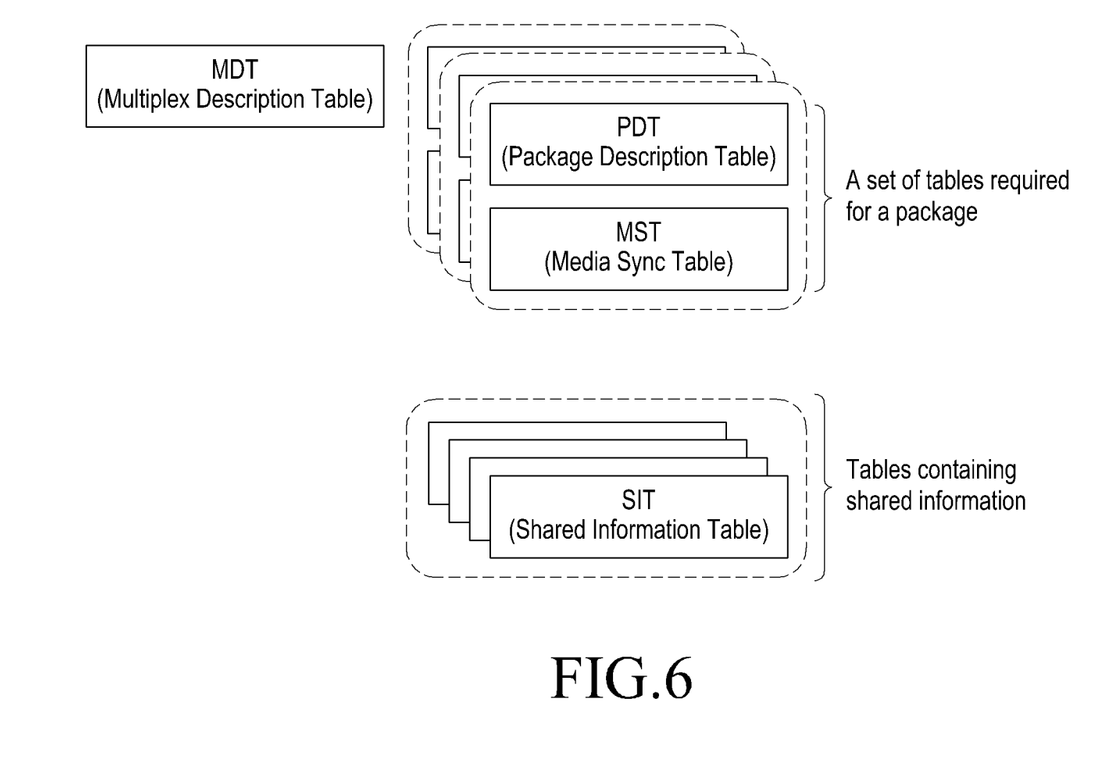
FIG. 6 schematically illustrates an example of a table configuration scheme in a digital broadcasting system according to an embodiment of the present invention.

FIG. 6 schematically illustrates an example of a table configuration scheme in a digital broadcasting system according to an embodiment of the present invention.

FIG. 6 illustrates a table structure in which a hierarchical structure-based table configuration scheme will be applied.

FIG. 6 describes an example of a table configuration scheme in a digital broadcasting system according to an embodiment of the present invention. Next, by referring to FIG. 7, another example of a table configuration scheme in a digital broadcasting system according to an embodiment of the present invention will be described.

Figure 7:
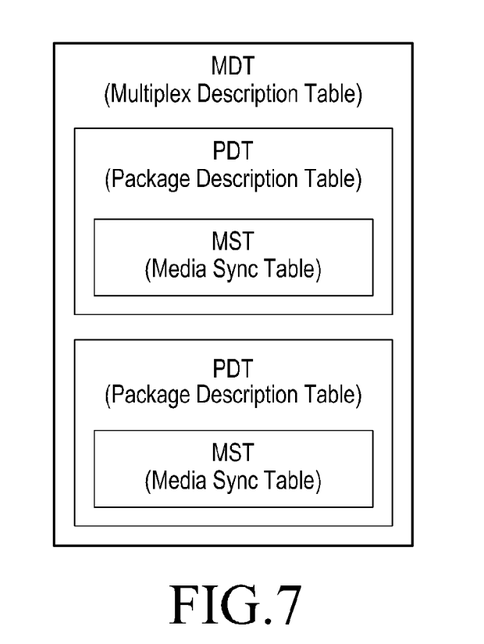
FIG. 7 schematically illustrates another example of a table configuration scheme in a digital broadcasting system according to an embodiment of the present invention.

FIG. 7 schematically illustrates another example of a table configuration scheme in a digital broadcasting system according to an embodiment of the present invention.

FIG. 7 illustrates a table structure in which a table configuration scheme which is based on a flat structure storing all information relating to an individual package in an MDT will be applied.

FIG. 7 describes another example of a table configuration scheme in a digital broadcasting system according to an embodiment of the present invention. Next, by referring to FIG. 8, another example of a table configuration scheme in a digital broadcasting system according to an embodiment of the present invention will be described.

Figure 8:
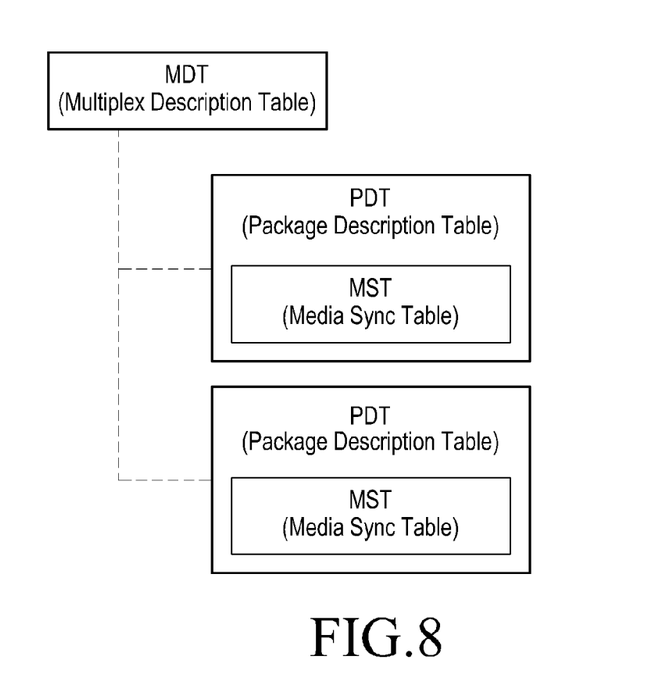
FIG. 8 schematically illustrates another example of a table configuration scheme in a broadcasting system according to an embodiment of the present invention. Through the drawings, it should be noted that similar reference numbers are used in order to illustrate the same or similar elements, features, and structures.

FIG. 8 schematically illustrates another example of a table configuration scheme in a digital broadcasting system according to an embodiment of the present invention.

In FIG. 8, an MDT and a PDT are formed based on a hierarchical structure, however, FIG. 8 illustrates a table structure in which a table configuration scheme which is formed based on a flat structure by including synchronization information of a corresponding package in a PDT will be applied.

In addition, FIG. 7 and FIG. 8 illustrate a table structure in which a table configuration scheme which does not use an SIT will be applied using a scheme which includes common information in an individual table for transmission. However, since a table structure does not have an effect on whether a table configuration scheme and a common information reference scheme are used, although a flat structure is used, common information may be used as a reference scheme by using an SIT, as needed.

Meanwhile, a table and common information defined by an embodiment of the present invention will be defined in a common format below. That is, an MDT, a PDT, an MST, and an SIT are basically defined as the same table format, that is, L2_signaling_table_section, and a signaling_table_t-able( ) part is varied according to a characteristic of each table. The common information basically has an L2_descriptor( ) structure, and a descriptor_data( ) part is varied according to individual common information.

Meanwhile, a common format will be described below.

TABLE 1

| Syntax |
|---|
| L2_signaling_section( ) {<br>    table_id<br>    section_syntax_indicator<br>    private_indicator<br>    reserved<br>    section_length<br>    table_id_extension<br>    reserved<br>    version_number<br>    current_next_indicator<br>    section_number<br>    last_section_number<br>    signaling_table_data( )<br>} |

In Table 1, table_id represents a serial number indicating an individual signaling table. For example, the table_id may be implemented as 8 bits and may be set as a unique value to distinguish each of the tables transmitted from a data link layer.

In Table 1, section_syntax_indicator indicates a type of a private section (hereinafter, referred to as a "private section"), and a value of the section_syntax_indicator may be set as a pre-set value, for example, 1.

In Table 1, a private_indicator is a flag indicating that a corresponding section is a private section, and a value of the private_indicator may be set as a pre-set value, for example, '1'.

In Table 1, a section_length indicates a size of a corresponding section.

In Table 1, table_id_extension indicates an additional ID for distinguishing a signaling table having an identical table_id. At this time, table_id_extensions used according to each of the signaling tables may be different from each other.

In Table 1, version_number indicates version information of a section which constitutes a corresponding signaling table. When content of the section is changed, for example, a value of the version_number may be increased by 1 modulo 32. When current_next_indicator is set as a pre-set value, for example, '0', the version information does not indicate version information of a section which is currently applicable, but indicates version information of a section which is applicable in the next time.

In Table 1, when current_next_indicator is set as a pre-set value, for example, '1', the current_next_indicator indicates synchronization information which is currently applicable. When current_next_indicator is set as a pre-set value, for example, '0', the current_next_indicator indicates synchronization information which is not currently applicable and is applicable in the next time.

In Table 1, section_number indicates a current section number, when a table includes many sections. A value of the section_number may be started from 0.

In Table 1, last_section_number indicates a last section number, when a table includes many sections.

TABLE 2

Syntax

L2_descriptor( ) {
    descriptor_tag
    descriptor_length
    descriptor_id
    descriptor_data( )
}

In Table 2, descriptor_tag indicates a type of information included in a descriptor.

In Table 2, descriptor_length indicates a size of the descriptor.

In Table 2, descriptor_id indicates ID for distinguishing common information having an identical descriptor_tag.

Meanwhile, a detailed format of a signaling_table_data( ) part of each table defined by an embodiment of the present invention will be described below. Signaling_table_data( ) defined by each table indicates the minimum amount of information which is required for a purpose of a corresponding table, and may be defined by adding information as needed.

(1) MDT (Multiplex Description Table)

The MDT provides configuration information of a current transmission stream, that is, an ensemble and package information included in each ensemble. The package information may be included in the MDT and be then transmitted or may be transmitted through a PDT.

TABLE 3

Syntax signaling_table_data( ) {
    num_ensembles
    for (i = 0; i < num_ensembles; ++i) {
        ensemble_id
        num_packages
        for (j = 0; j < num_packages; ++j) {
            package_id
            use_separate_table_flag
            if (use_separate_table_flag == '0')
                package_description_data( )
        }
    }
}

In Table 3, num_ensembles indicates the number of ensembles included in a transmission stream.

In Table 3, ensemble_id indicates an ensemble ID.

In Table 3, num_packages indicates the number of packages included in an ensemble stream.

In Table 3, package_id indicates a package ID.

In Table 3, use_separate_table_flag is a flag which informs of whether package-related information is included in an MDT or whether the package-related information is transmitted through a separate PDT. When a value of use_separate_table_flag is a pre-set value, for example, a value of '0', this indicates that the package-related information is included in the MDT and transmitted. When a value of the use_separate_table_flag is a pre-set value, for example, a value of '1', this indicates that the package-related information is transmitted through a PDT.

In Table 3, table_extension_id is replaced by MDT_protocol_version. In this case, the MDT_protocol_version indicates version information of MDT syntax.

(2) PDT (Package Description Data)

The PDT stores detailed information relating to a package.

TABLE 4

Syntax signaling_table_data( ) {
    package_id
    package_description_data( )
}

In Table 4, package_id indicates a package ID.

In Table 4, table_extension_id is replaced by PDT_protocol_version. In this case, the PDT_protocol_version indicates version information of PDT syntax (3) MST (Media Sync Table)

The MST stores synchronization information of a main audio and video component included in a package.

TABLE 5

Syntax signaling_table_data( ) {
    package_id
    media_sync_data( )
}

In Table 5, package_id indicates a package ID.

In Table 5, table_extension_id is replaced by MST_protocol_version. In this case, the MST_protocol_version indicates version information of MST syntax.

(4) SIT (Shared Information Table)

TABLE 6

Syntax signaling_table_data( ) {
    num_descriptors
    for (i = 0; i < num_descriptors; ++i)
        descriptor_data( )
}

In Table 6, num_descriptors indicates the number of descriptors storing common information.

In Table 6, table_extension_id is replaced by SIT_protocol_version and ensemble_id. In this case, the SIT_protocol_version indicates version information of SIT syntax.

(5) Package_Description_Data( )

Detailed information group relating to a package

TABLE 7

Syntax package_description_data( ) {
    SP_indicator

TABLE 7-continued

| Syntax |
| --- |
| IP_version_flag<br>num_components<br>for (i = 0; i < num_components; ++i) {<br>  component_tag<br>  source_IP_address<br>  destination_IP_address<br>  num_component_level_descriptors<br>  for (j = 0; j < num_component_level_descriptors; ++j) {<br>    descriptor_tag<br>    use_reference_flag<br>    if (use_reference_flag == '1') {<br>      table_id<br>      descriptor_id<br>    }<br>    else {<br>      descriptor_length<br>      descriptor_data( )<br>    }<br>  }<br>}<br>num_package_level_descriptors<br>for (k = 0; k < num_package_level_descriptors; ++k) {<br>  descriptor_tag<br>  use_reference_flag<br>  if (use_reference_flag == '1') {<br>    table_id<br>    descriptor_id<br>  }<br>  else {<br>    descriptor_length<br>    descriptor_data( )<br>  }<br>}<br>use_separate_table_flag<br>If (use_separate_table_flag == '0')<br>  media_sync_data( )<br>} |

In Table 7, SP_indicator indicates whether service protection is applied. When a value of the SP_indicator is a pre-set value, for example, a value of '1', this indicates that service protection is applied to a part of the component stream which constitutes a corresponding package. When a value of the SP_indicator is a pre-set value, for example, a value of '0', this indicates that a service protection is not applied to all component streams.

In Table 7, when IP_version_flag is a pre-set value, for example, a value of '0', this indicates that IPv4 is used, and when a value of the IP_version_flag is a pre-set value, for example, a value of '1', this indicates that IPv6 is used.

In Table 7, num_components indicates the number of component streams which constitute a package.

In Table 7, component_tag indicates an ID for distinguishing individual components. In addition, the component_tag has a unique value in a package.

In Table 7, source_IP_address indicates a source IP address.

In Table 7, destination_IP_address indicates a destination IP address.

In Table 7, num_component_level_descriptors indicates the number of descriptors with respect to a corresponding component.

In Table 7, descriptor_tag indicates a type of information included in a descriptor.

In Table 7, use_reference_flag is a flag which informs of whether a corresponding descriptor is included in a table for transmission, or whether a descriptor included in an SIT is referred to. When a value of the use_reference_flag is a pre-set value, for example, a value of '0', this indicates that a corresponding descriptor is included for transmission, and when a value of the use_reference_flag is a pre-set value, for example, a value of '1', a value, this indicates that a value stored in an SIT is referred.

In Table 7, tabl_id indicates table_id of an SIT transmitting a corresponding descriptor.

In Table 7, descriptor_id indicates an ID of a descriptor included in the SIT.

In Table 7, descriptor_length indicates a size of the descriptor.

In Table 7, num_package_level_descriptor indicates the number of descriptors relating to a corresponding package.

In Table 7, use_separate_table_flag is a flag which informs of whether synchronization-related information is included in grouped information or whether the synchronization-related information is transmitted through a separate MST. When a value of use_separate_table_flag is a pre-set value, for example, a value of '0', this indicates that the synchronization-related information is included in grouped information and transmitted. When a value of the use_separate_table_flag is a pre-set value, for example, a value of '1', this indicates that the synchronization-related information is transmitted through an MST.

(6) Media_Sync_Data( )

A synchronization information group of a specific audio and video stream included in a package

TABLE 8

| Syntax |
| --- |
| media_sync_data( ) {<br>  streaming_protocol<br>  default_video_component_tag<br>  default_audio_component_tag<br>  num_sync_data<br>  for (i = 0; i < num_sync_data; ++i)<br>    actual_media_sync_data(streaming_protocol)<br>} |

In Table 8, streaming_protocol indicates a type of a streaming protocol used for transmitting an audio stream and a video stream to be synchronized.

In Table 8, default_video_component_tag indicates a video component ID included in a package.

In Table 8, default_audio_component_tag indicates an audio component ID included in a package.

In Table 8, num_sync_data indicates the number of synchronization information.

In Table 8, actual_media_sync_data( ) indicates synchronization information according to used streaming protocol.

Meanwhile, types of information provided by a descriptor are various, and an example of a descriptor_data( ) part of a component level descriptor that approximatively provides a main feature of an individual component which constitutes a package will be described.

TABLE 9

| Syntax |
| --- |
| descriptor_data( ) {<br>  component_type<br>  component_encryption_flag<br>  If (component_encryption_flag) {<br>    num_STKM_streams;<br>    for (I = 0; I < num_STKM_streams; ++i)<br>      STKM_stream_id;<br>  }<br>  component_data(component_type)<br>} |

In Table 9, component_type indicates the kind of components.

In Table 9, component_encryption_flag informs of whether service protection is applied with respect to a corresponding component, and indicates that a service protection is applied, when a value of the component_encryption_flag is a pre-set value, for example, a value of '1'.

In table 9, num_STKM_streams indicates the number of STKM streams which are usable for decryption, when service protection is applied.

In Table 9, STKM_stream_id indicates a STKM stream ID.

In Table 9, component_data indicates configuration information required for decoding a corresponding component.

The following is an example of component_data( ) required for decoding a video stream encoded with high efficiency video coding (HEVC). A meaning of used attribute and a value which is usable follow an H.265 standard.

TABLE 10

| component_data( ) { | |
|---|---|
| general_profile_space | u(2) |
| general_tier_flag | u(1) |
| general_profile_idc | u(5) |
| for( j = 0; j < 32; j++ ) | |
| general_profile_compatibility_flag[j] | u(1) |
| general_progressive_source_flag | u(1) |
| general_interlaced_source_flag | u(1) |
| general_non_packed_constraint_flag | u(1) |
| general_frame_only_constraint_flag | u(1) |
| general_reserved_zero_44bits | u(44) |
| general_level_idc | u(8) |
| } | |

Particular aspects of the present invention may be implemented as a computer-readable code in a computer-readable recording medium. The computer-readable recording medium is a predetermined data storage device which can store data which can be read by a computer system. The computer-readable recording medium may include a Read-Only Memory (ROM), a Random-Access Memory (RAM), CD-ROMs, magnetic tapes, floppy disks, optimal data storage devices, and carrier waves (such as data transmission through the Internet). The computer-readable recording medium may be distributed through computer systems connected to the network, and accordingly the computer-readable code is stored and executed in a distributed manner. Further, functional programs, codes and code segments for achieving the present invention may be easily interpreted by programmers skilled in the art which the present invention pertains to.

It will be understood that a method and apparatus according to an embodiment of the present invention may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the software may be stored in a machine (for example, a computer)-readable storage medium. It can be also appreciated that the memory included in the mobile terminal is one example of machine-readable devices suitable for storing a program including instructions that are executed by a processor device to thereby implement embodiments of the present invention.

Accordingly, the present invention includes a program for a code implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present invention appropriately includes equivalents of the program.

Further, an apparatus according to an embodiment of the present invention may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

Meanwhile, although the concrete embodiments of the present invention have been described in the detailed description of the present invention, various modifications can be made without departing from the scope of the present invention. Therefore, the scope of the present invention should not be defined as being limited to the embodiments, but should be defined by the appended claims and equivalents thereof.

The invention claimed is:

1. A method for transmitting signaling information in a digital broadcasting system, the method comprising:
   determining a number of services related to the signaling information to be transmitted on a data link layer;
   generating a first signaling table including data of the services and a common information table including common information related to the services, if the number of services is greater than a predetermined value, wherein the first signaling table includes an indication that indicates the common information is not included in the first signaling table;
   generating a second signaling table including the data of the services and the common information, if the number of services is less than or equal to the predetermined value, wherein the second signaling table includes an indication that indicates the common information is included in the second signaling table;
   generating a table flag to inform of a signaling table configuration scheme; and
   transmitting the signaling information including the table flag, the generated first signaling table and the generated common information table, or the generated second signaling table; and
   identifying whether a signaling information database is required to update and if the signaling information database is required to update, storing the update in the signaling information database,
   wherein the generated first signaling table includes at least one indication that indicates which common information relates to each of the services.

2. The method of claim 1, wherein the second signaling table includes at least one of a multiplex description table, at least one of a package description table, at least one of a media sync table and at least one of a shared information table.

3. A method for receiving signaling information in a digital broadcasting system, the method comprising:
- receiving the signaling information including a table and a table flag to inform of a signaling table configuration scheme;
- determining a structure of the table based on an indication indicating common information is included in a signaling table included in the table;
- if the structure of the table is a hierarchical structure, detecting, from the table, an indication that indicates which common information of the common information included in the signaling table relates to services, wherein the table includes the signaling table including data of the services and common information table including the common information related to the services, detecting common information that relates to the services from the common information table based on the indication, and playing the services based on the common information detected from the common information table and the data of the services included in the signaling table;
- if the structure of the table is a flat structure, detecting the common information that relates to the services from the signaling table being the table and playing the services based on the common information detected from the signaling table and the data of the services included in the signaling table; and
- identifying whether a signaling information database is required to update and if the signaling information database is required to update, storing the update in the signaling information database.

4. The method of claim 3, wherein the storing of the update in the signaling information database comprises:
- identifying whether a signaling information database is required to update; and
- if the signaling information database is required to update, storing the first signaling information table and the common information table, or the second signaling information, in the signaling information database.

5. An apparatus for transmitting signaling information in a digital broadcasting system, the apparatus comprising:
- a controller configured to:
  - determine a number of services related to the signaling information to be transmitted on a data link layer,
  - generate a first signaling table including data of the services and a common information table including common information related to the services, if the number of services is greater than a predetermined value, wherein the first signaling table includes an indication that indicates the common information is not included in the first signaling table,
  - generate a second signaling table including the data of the services and the common information, if the number of services is less than or equal to the predetermined value, wherein the second signaling table includes an indication that indicates the common information is included in the second signaling table,
  - generate a table flag to inform of a signaling table configuration scheme, and
  - identify whether a signaling information database is required to update and if the signaling information database is required to update, storing the update in the signaling information database; and
- a transmitter configured to transmit the signaling information including the table flag, the generated first signaling table and the generated common information table, or the generated second signaling table,
- wherein the generated first signaling table includes at least one indication that indicates which common information relates to each of the services.

6. The apparatus of claim 5, wherein the second signaling table includes at least one of a multiplex description table, at least one of a package description table, at least one of a media sync table and at least one of a shared information table.

7. An apparatus for receiving signaling information in a digital broadcasting system, the apparatus comprising:
- a receiver configured to receive the signaling information including a table and a table flag to inform of a signaling table configuration scheme; and
- a controller configured to:
  - determine a structure of the table based on an indication indicating common information is included in a signaling table included in the table,
  - if the structure of the table is a hierarchical structure, detect, from the table, an indication that indicates which common information of the common information included in the signaling table relates to services, wherein the table includes the signaling table including data of the services and common information table including the common information related to the services, detect common information that relates to the services from the common information table based on the indication, and play the services based on the common information detected from the common information table and the data of the services included in the signaling table,
  - if the structure of the table is a flat structure, detect the common information that relates to the services from the signaling table being the table and play the services based on the common information detected from the signaling table and the data of the services included in the signaling table, and
  - identify whether a signaling information database is required to update and if the signaling information database is required to update, storing the update in the signaling information database.

8. The apparatus of claim 7, wherein the controller is further configured to:
- identify whether the signaling information database is required to update, and
- if the signaling information database is required to update, store the first signaling information table and the common information table, or the second signaling information, in the signaling information database.

* * * * *